United States Patent
Chen et al.

(10) Patent No.: US 9,202,437 B2
(45) Date of Patent: Dec. 1, 2015

(54) LCD SYSTEM, AND AC ADAPTER AND BACKLIGHT DRIVING MODULE FOR THE SAME

(71) Applicants: LITE-ON ELECTRONICS (GUANGZHOU) LIMITED, Guangzhou (CN); LITE-ON TECHNOLOGY CORP., Taipei (TW)

(72) Inventors: Wen-Sheng Chen, Taipei (TW); Wei-Chih Liao, Taiepi (TW); Liang-Hong Wang, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 172 days.

(21) Appl. No.: 14/177,258

(22) Filed: Feb. 11, 2014

(65) Prior Publication Data

US 2015/0228250 A1     Aug. 13, 2015

(51) Int. Cl.
| | |
|---|---|
| *G09G 3/36* | (2006.01) |
| *G09G 5/10* | (2006.01) |
| *G02F 1/1335* | (2006.01) |
| *G09G 3/34* | (2006.01) |
| *G09G 5/18* | (2006.01) |

(52) U.S. Cl.
CPC .............. *G09G 5/10* (2013.01); *G02F 1/133603* (2013.01); *G09G 3/3406* (2013.01); *G09G 5/18* (2013.01)

(58) Field of Classification Search
CPC .. G02F 1/133603; G09G 3/3406; G09G 5/10; G09G 5/18
USPC .................................................. 345/102, 204
See application file for complete search history.

(56) References Cited

U.S. PATENT DOCUMENTS

| | | | | |
|---|---|---|---|---|
| 2005/0013143 | A1* | 1/2005 | Kim | H02M 1/4225 363/20 |
| 2009/0251481 | A1* | 10/2009 | Rumreich | G09G 3/3406 345/589 |
| 2010/0176656 | A1* | 7/2010 | Chung | G09G 3/3611 307/31 |
| 2013/0147862 | A1* | 6/2013 | Atkins | G09G 3/342 345/690 |

* cited by examiner

*Primary Examiner* — Viet Pham
(74) *Attorney, Agent, or Firm* — Rosenberg, Klein & Lee

(57) ABSTRACT

A liquid crystal display (LCD) system includes an LCD device and an alternating current (AC) adapter. The LCD device includes a video processing module and a light emitting diode (LED) backlight module. The AC adapter includes a backlight driving module and an AC-to-DC (direct current) converting module. The backlight driving module generates a backlight driving signal, and outputs the backlight driving signal to drive the LED backlight module of the LCD device. The AC-to-DC converting module is adapted to convert an AC line voltage into first and second DC voltages, and outputs the first and second DC voltages to power the video processing module of the LCD device and the backlight driving module, respectively.

18 Claims, 14 Drawing Sheets

LCD SYSTEM, AND AC ADAPTER AND BACKLIGHT DRIVING MODULE FOR THE SAME

BACKGROUND OF THE INVENTION

1. Field of the Invention

This invention relates to liquid crystal display (LCD) techniques, and more particularly to an LCD system, and an alternating current (AC) adapter and a backlight driving module for the same.

2. Description of the Related Art

U.S. Pat. No. 8,294,660 discloses a conventional LED-backlit LCD device embedded with an AC-to-DC (direct current) converting module and a backlight driving module. However, the conventional LED-backlit LCD device has the following disadvantages:

1. Design of the appearance of the conventional LED-backlit LCD device is relatively limited. Particularly, the cost of the conventional LED-backlit LCD device increases rapidly with thinning of the same.

2. When at least one of the embedded AC-to-DC converting module and the embedded backlight driving module is damaged, the repair cost of the conventional LED-backlit LCD device is relatively high.

Moreover, how the same backlight driving module can be used in different types of LED-backlit LCD devices is important for the purpose of reducing the inventory risk of the backlight driving modules.

SUMMARY OF THE INVENTION

Therefore, an object of the present invention is to provide a liquid crystal display (LCD) system, and an alternating current (AC) adapter and a backlight driving module for the same, that can overcome the aforesaid drawbacks associated with the prior art.

According to one aspect of this invention, an LCD system comprises an LCD device and an AC adapter. The LCD device includes a video processing module and an LED backlight module. The AC adapter includes a backlight driving module and an AC-to-DC (direct current) converting module. The backlight driving module is coupled to the LED backlight module of the LCD device, generates a backlight driving signal, and outputs the backlight driving signal to drive the LED backlight module of the LCD device. The AC-to-DC converting module is coupled to the video processing module of the LCD device and the backlight driving module, is adapted to convert an AC line voltage into first and second DC voltages, and outputs the first and second DC voltages to power the video processing module of the LCD device and the backlight driving module, respectively.

According to another aspect of this invention, there is provided an AC adapter for powering and driving an LCD device that includes a video processing module and an LED backlight module. The AC adapter comprises a backlight driving module and an AC-to-DC converting module. The backlight driving module generates a backlight driving signal that is adapted to drive the LED backlight module of the LCD device. The AC-to-DC converting module is coupled to the backlight driving module, and is adapted to receive an AC line voltage. The AC-to-DC converting module converts the AC line voltage into a first DC voltage that is adapted to power the video processing module of the LCD device, and into a second DC voltage to power the backlight driving module.

According to yet another aspect of this invention, there is provided a backlight driving module for generating a backlight driving signal that is adapted to drive an LED backlight module of an LCD device. The LCD device further includes a video processing module that generates a backlight-ON control signal. The backlight driving module may be disposed in or outside the LCD device, and comprises a decoding circuit and a driving circuit. The decoding circuit generates a variable maximum backlight current control signal. The driving circuit is coupled to the decoding circuit for receiving the maximum backlight current control signal therefrom, and is adapted to receive the backlight-ON control signal from the video processing module. The driving circuit generates the backlight driving signal based on the maximum backlight current control signal and the backlight-ON control signal, such that the backlight-ON control signal determines whether or not a backlight current output is provided to the LED backlight module of the LCD device, and such that a maximum magnitude of the backlight current output is associated with the maximum backlight current control signal.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
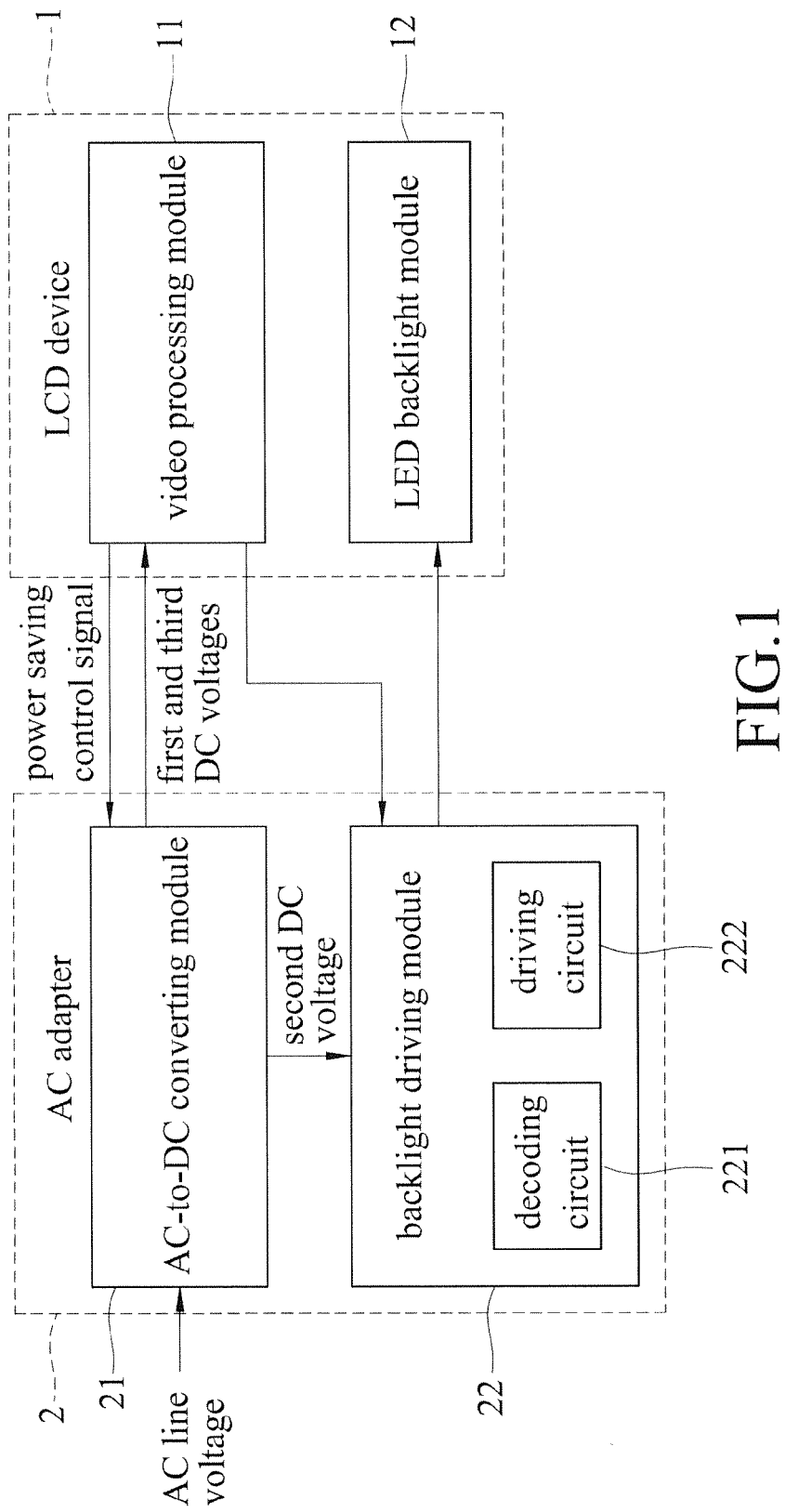
FIG. 1 is a functional block diagram illustrating the first preferred embodiment of a liquid crystal display (LCD) system according to this invention.
Figure 2:
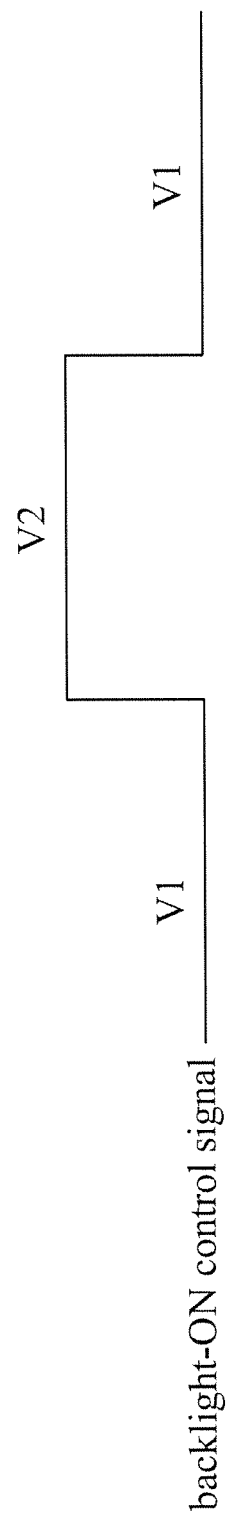
FIG. 2 is a timing diagram illustrating a backlight-ON control signal of the first preferred embodiment.
Figure 3:
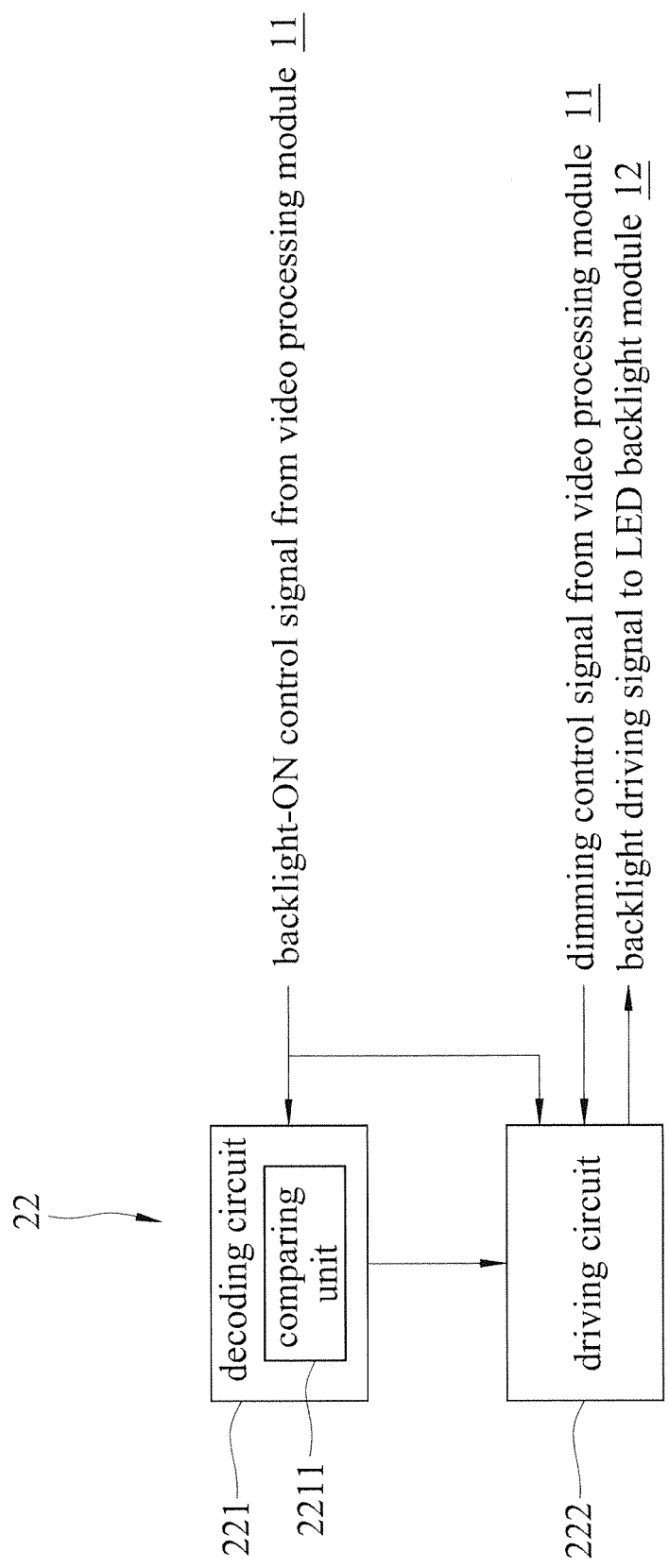
FIG. 3 is a functional block diagram illustrating a backlight driving module of the first preferred embodiment.

Referring to FIGS. 1-3, the first preferred embodiment of a liquid crystal display (LCD) system according to this invention includes an LCD device 1 and an alternating current (AC) adapter 2. The LCD device 1 may be in the form of, for instance, a monitor or a television, and includes a video processing module 11, a light emitting diode (LED) backlight module 12 and at least one other necessary element (not shown) such as an LCD panel. The AC adapter 2 includes an AC-to-DC (direct current) converting module 21 and a backlight driving module 22.

The video processing module 11 of the LCD device 1 generates a power saving control signal, a backlight-ON control signal and a dimming control signal. The backlight-ON control signal switches between a first voltage (V1) and a second voltage (V2) that is associated with the type of the LCD device 1.

The AC-to-DC converting module 21 of the AC adapter 2 is coupled to the video processing module 11 of the LCD device 1 and the backlight driving module 22 of the AC adapter 2, is adapted to receive an AC line voltage, and receives the power saving control signal from the video processing module 11 of the LCD device 1. The AC-to-DC converting module 21 converts the AC line voltage into a first DC voltage (e.g., 5V), a second DC voltage (e.g., 32V) and a third DC voltage (e.g., 12V), outputs the first and second DC voltages to power the video processing module 11 of the LCD device 1 and the backlight driving module 22 of the AC adapter 2, respectively, and selectively outputs the third DC voltage to power the video processing module 11 of the LCD device 1 based on the power saving control signal. For example, the power saving control signal switches between logic high and low voltages (disabling and enabling power-saving, respectively), and the AC-to-DC converting module 21 of the AC adapter 2 outputs the third DC voltage when the power saving control signal is at the logic high voltage, and does not output the third DC voltage when the power saving control signal is at the logic low voltage.

The backlight driving module 22 of the AC adapter 2 includes a decoding circuit 221 and a driving circuit 222. The decoding circuit 221 is coupled to the video processing module 11 of the LCD device 1 for receiving the backlight-ON control signal therefrom. The decoding circuit 221 includes a comparing unit 2211 that compares the second voltage (V2) of the backlight-ON control signal with at least one reference voltage and that generates a maximum backlight current control signal with reference to a result of the comparison so as to associate the maximum backlight current control signal with the type of the LCD device 1. Therefore, the maximum backlight current control signal varies depending on the second voltage (V2) of the backlight-ON control signal, and in other words, varies depending on the type of the LCD device 1. The driving circuit 222 is coupled to the decoding circuit 221, and to the video processing module 11 and the LED backlight module 12 of the LCD device 1, receives the maximum backlight current control signal from the decoding circuit 221, and receives the backlight-ON control signal and the dimming control signal from the video processing module 11 of the LCD device 1. The driving circuit 222 generates a backlight driving signal based on the maximum backlight current control signal, the backlight-ON control signal and the dimming control signal, and outputs the backlight driving signal to drive the LED backlight module 12 of the LCD device 1, such that the backlight-ON control signal determines whether or not a backlight current output is provided to the LED backlight module 12 of the LCD device 1, such that a maximum magnitude (Imax) of the backlight current output is associated with the maximum backlight current control signal, and such that an average magnitude of the backlight current output is associated with the dimming control signal. For example, the second voltage (V2) may be equal to 2V, 3.5V and 5V respectively for different types of LCD devices 1, and there are two reference voltages equal to 3V and 4V, respectively. When the backlight-ON control signal is at the first voltage (V1), no backlight current output is provided to the LED backlight module 12 of the LCD device 1 (i.e., no current flows through the LED backlight module 12). When the backlight-ON control signal is at the second voltage (V2), the backlight current output is provided to the LED backlight module 12 of the LCD device 1 in order to drive the LED backlight module 12, where the backlight current output pulsates between the maximum magnitude (Imax) and zero, in which the maximum magnitude (Imax) is determined according to equation 1 depending on the result of comparing the second voltage (V2) of the backlight-ON control signal with the two reference voltages of 3V and 4V, and where the backlight current output is pulse width modulated to have a duty ratio associated with the dimming control signal.

$$Imax = \begin{cases} 300\,mA, & \text{if } V2 < 3V \\ 350\,mA, & \text{if } 3V < V2 < 4V \\ 400\,mA, & \text{if } V2 > 4V \end{cases} \quad \text{equation 1}$$

It is noted that, the decoding circuit 221 and control logic of the driving circuit 222 of the backlight driving module 22 of the AC adapter 2 may be combined in a single integrated circuit, or distributed in multiple integrated circuits. For example, the decoding circuit 221 and the control logic of the driving circuit 222 are fabricated in a single integrated circuit, or the decoding circuit 221 is fabricated in one integrated circuit while the control logic of the driving circuit 222 is fabricated in another integrated circuit. Moreover, in other embodiments, the backlight driving module 22 may be disposed in the LCD device 1, instead of the AC adapter 2.

In view of the above, the LCD system of this embodiment has the following advantages:

1. Since the AC-to-DC converting module 21 and the backlight driving module 22 are disposed outside the LCD device 1, design of the appearance of the LCD device 1 is relatively flexible compared to the conventional LED-backlit LCD device. Particularly, the cost of the LCD device 1 does not increase with thinning of the same compared to the conventional LED-backlit LCD device.

2. Since the AC-to-DC converting module 21 and the backlight driving module 22 are disposed outside the LCD device 1, a repairman can replace the damaged AC adapter 2 with a new one without having to disassemble the LCD device 1, which results in a relatively low repair cost compared to the conventional LED-backlit LCD device.

3. Since the backlight driving module 22 can change the maximum magnitude (Imax) of the backlight current output according to the type of the LCD device 1, the same backlight driving module 22 can be used with different types of LCD devices 1, such as those having LCD panels of different sizes or models or those having LCD panels manufactured by different companies.

Figure 4:
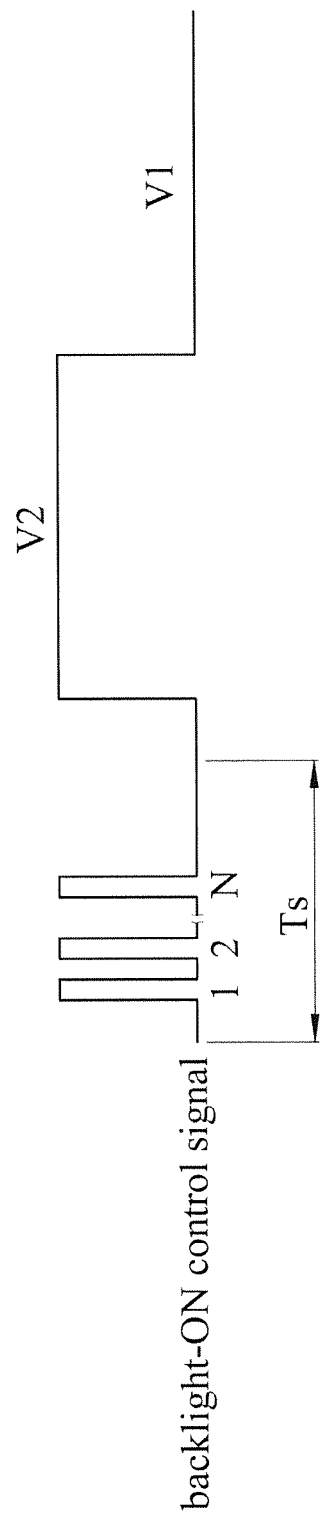
FIG. 4 is a timing diagram illustrating a backlight-ON control signal of the second preferred embodiment of an LCD system according to this invention.
Figure 5:
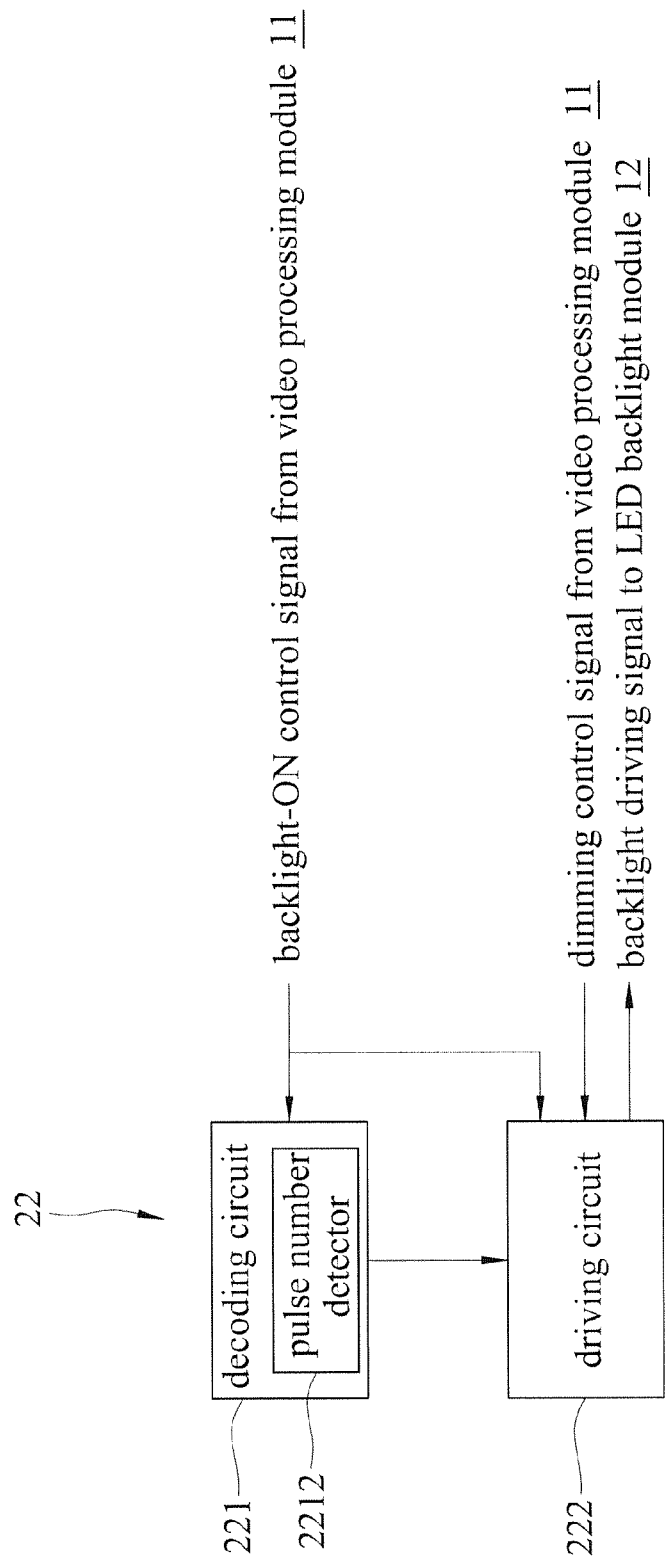
FIG. 5 is a functional block diagram illustrating a backlight driving module of the second preferred embodiment.

FIGS. 1, 4 and 5 illustrate the second preferred embodiment of an LCD system according to this invention, which is a modification of the first preferred embodiment. Unlike the first preferred embodiment, the backlight-ON control signal of the second preferred embodiment includes a predetermined number (N) of pulses during a setting time period (Ts), where N≥1 and where the predetermined number (N), instead of the second voltage (V2), is associated with the type of the LCD device 1. In addition, the decoding circuit 221 of the backlight driving module 22 of the AC adapter 2 includes a pulse number detector 2212, instead of the comparing unit 2211 (see FIG. 3). The pulse number detector 2212 detects the number (N) of the pulses of the backlight-ON control signal during the setting time period (Ts), and generates the maximum backlight current control signal with reference to a result of the detection so as to associate the maximum backlight current control signal with the type of the LCD device 1. For example, the number (N) of the pulses of the backlight-ON control signal may be equal to 3, 5 or 7, and the maximum magnitude (Imax) of the backlight current output may be expressed as equation 2.

$$Imax = \begin{cases} 300 \text{ mA, if } N = 3 \\ 350 \text{ mA, if } N = 5 \\ 400 \text{ mA, if } N = 7 \end{cases} \quad \text{equation 2}$$

Figure 6:
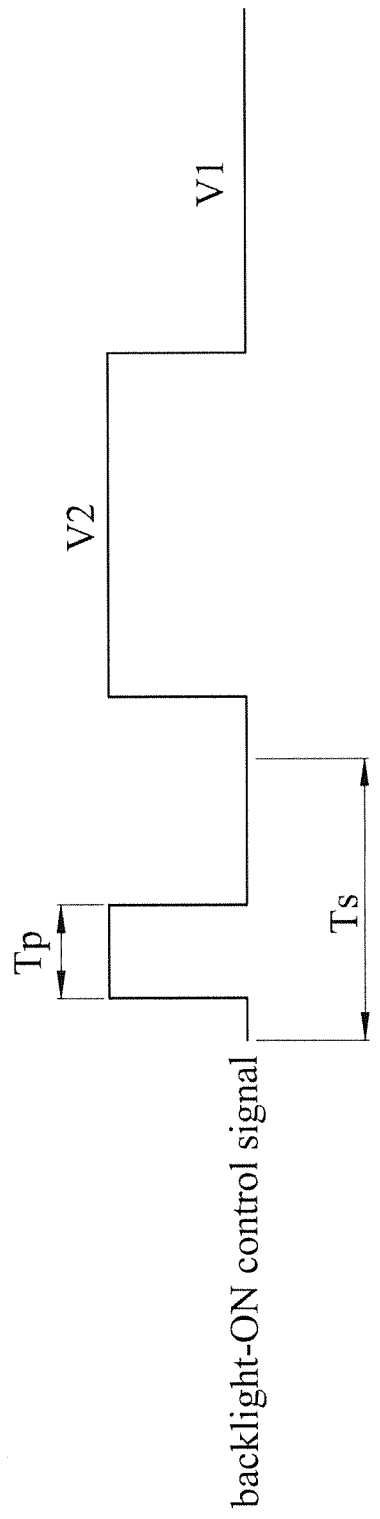
FIG. 6 is a timing diagram illustrating a backlight-ON control signal of the third preferred embodiment of an LCD system according to this invention.
Figure 7:
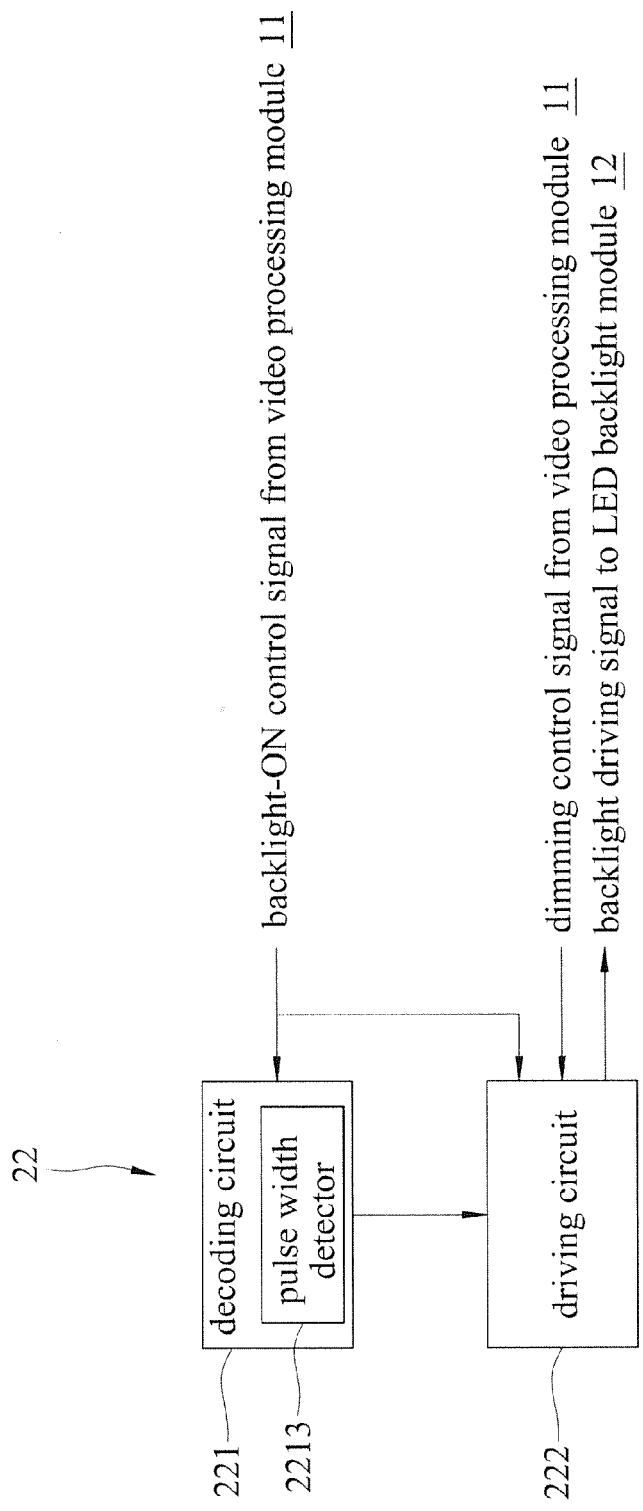
FIG. 7 is a functional block diagram illustrating a backlight driving module of the third preferred embodiment.

FIGS. 1, 6 and 7 illustrate the third preferred embodiment of an LCD system according to this invention, which is a modification of the first preferred embodiment. Unlike the first preferred embodiment, the backlight-ON control signal of the third preferred embodiment includes a pulse with a predetermined width (Tp) during a setting time period (Ts), where the width (Tp), instead of the second voltage (V2), is associated with the type of the LCD device 1. In addition, the decoding circuit 221 of the backlight driving module 22 of the AC adapter 2 includes a pulse width detector 2213, instead of the comparing unit 2211 (see FIG. 3). The pulse width detector 2213 detects the width (Tp) of the pulse of the backlight-ON control signal during the setting time period (Ts), and generates the maximum backlight current control signal with reference to a result of the detection so as to associate the maximum backlight current control signal with the type of the LCD device 1. For example, the width (Tp) of the pulse of the backlight-ON control signal may be equal to 1 ms, 2 ms or 3 ms, and the maximum magnitude (Imax) of the backlight current output may be expressed as equation 3.

$$Imax = \begin{cases} 300 \text{ mA, if } Tp = 1 \text{ ms} \\ 350 \text{ mA, if } Tp = 2 \text{ ms} \\ 400 \text{ mA, if } Tp = 3 \text{ ms} \end{cases} \quad \text{equation 3}$$

It is noted that, in other embodiments, the backlight-ON control signal may be any combination of the backlight-ON control signals shown respectively in FIGS. 2, 4 and 6, and the decoding circuit 221 of the backlight driving module 22 of the AC adapter 2 may include a corresponding combination of the comparing unit 2211 (see FIG. 3), the pulse number detector 2212 (see FIG. 5) and the pulse width detector 2213.

Figure 8:
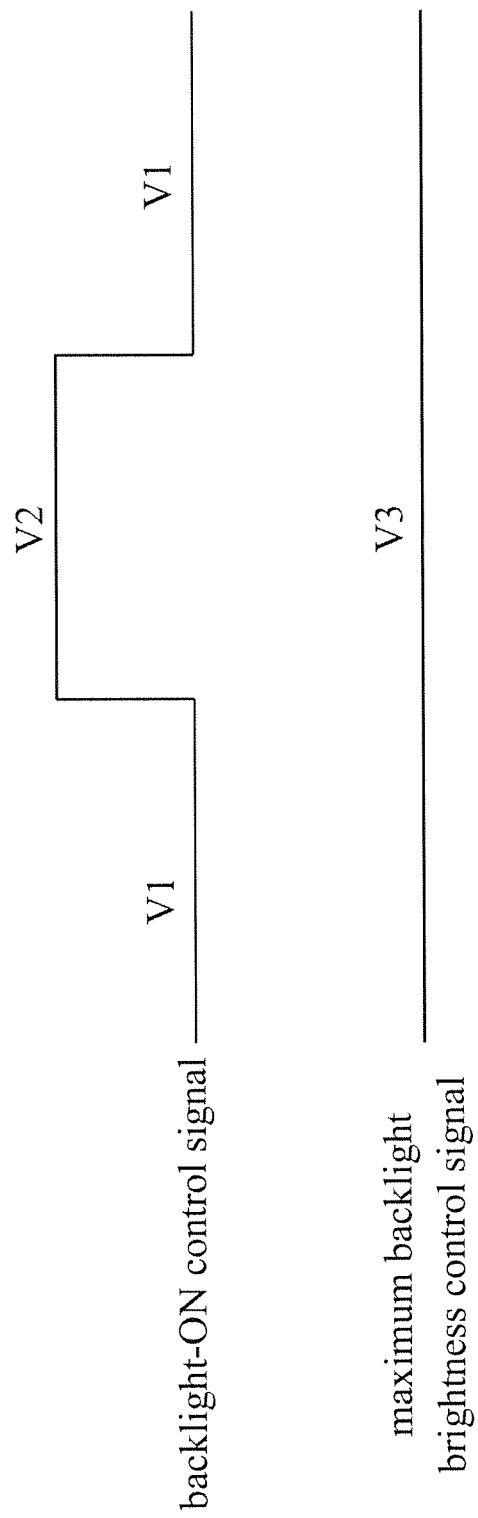
FIG. 8 is a timing diagram illustrating a backlight-ON control signal and a maximum backlight brightness control signal of the fourth preferred embodiment of an LCD system according to this invention.
Figure 9:
FIG. 9 is a functional block diagram illustrating a backlight driving module of the fourth preferred embodiment.

FIGS. 1, 8 and 9 illustrate the fourth preferred embodiment of an LCD system according to this invention, which is a modification of the first preferred embodiment. Unlike the first preferred embodiment, the video processing module 11 of the LCD device 1 of the fourth preferred embodiment further gene rates a maximum backlight brightness control signal that has a predetermined voltage (V3), where the predetermined voltage (V3), instead of the second voltage (V2), is associated with the type of the LCD device 1. In addition, the decoding circuit 221 of the backlight driving module 22 of the AC adapter 2 receives the maximum backlight brightness control signal, instead of the backlight-ON control signal, from the video processing module 11 of the LCD device 1, and the comparing unit 2211 thereof compares the predetermined voltage (V3) of the maximum backlight brightness control signal with the at least one reference voltage, and generates the maximum backlight current control signal with reference to the result of the comparison so as to associate the maximum backlight current control signal with the type of the LCD device 1. Therefore, the maximum backlight current control signal varies depending on the predetermined voltage (V3) of the maximum backlight brightness control signal, i.e., varies depending on the type of the LCD device 1. For example, the predetermined voltage (V3) of the maximum backlight brightness control signal may be equal to 2V, 3.5V or 5V, and the maximum magnitude (Imax) of the backlight current output may be expressed as equation 4.

$$Imax = \begin{cases} 300 \text{ mA, if } V3 < 3V \\ 350 \text{ mA, if } 3V < V3 < 4V \\ 400 \text{ mA, if } V3 > 4V \end{cases} \quad \text{equation 4}$$

Figure 10:
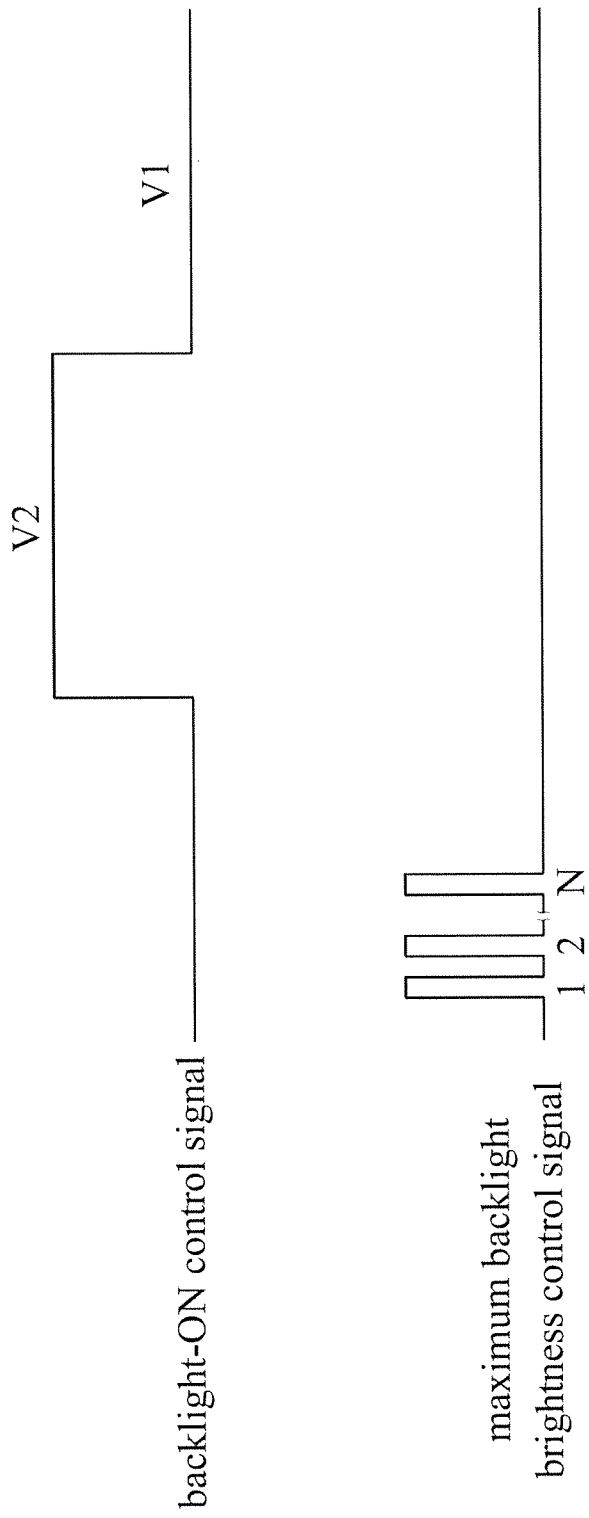
FIG. 10 is a timing diagram illustrating a backlight-ON control signal and a maximum backlight brightness control signal of the fifth preferred embodiment of an LCD system according to this invention.
Figure 11:
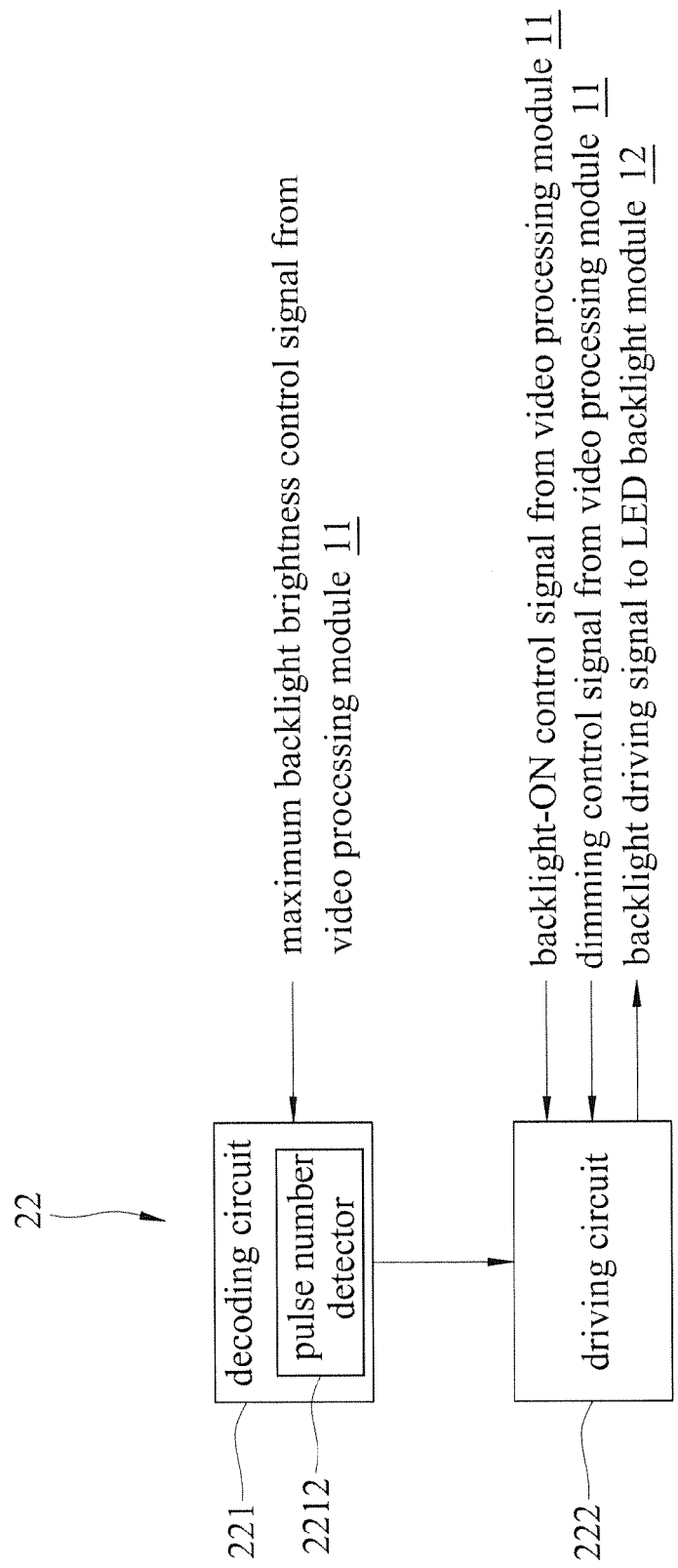
FIG. 11 is a functional block diagram illustrating a backlight driving module of the fifth preferred embodiment.

FIGS. 1, 10 and 11 illustrate the fifth preferred embodiment of an LCD system according to this invention, which is a modification of the fourth preferred embodiment. Unlike the fourth preferred embodiment, the maximum backlight brightness control signal of the fifth preferred embodiment includes a predetermined number (N) of pulses, where N≥1 and where the predetermined number (N) is associated with the type of the LCD device 1. In addition, the decoding circuit 221 of the backlight driving module 22 of the AC adapter 2 includes a pulse number detector 2212, instead of the comparing unit 2211 (see FIG. 9). The pulse number detector 2212 detects the number (N) of the pulses of the maximum backlight brightness control signal, and generates the maximum backlight current control signal with reference to a result of the detection so as to associate the maximum backlight current control signal with the type of the LCD device 1. For example, the number (N) of the pulses of the maximum backlight brightness control signal may be equal to 3, 5 or 7, and the maximum magnitude (Imax) of the backlight current output may be expressed as equation 2.

Figure 12:
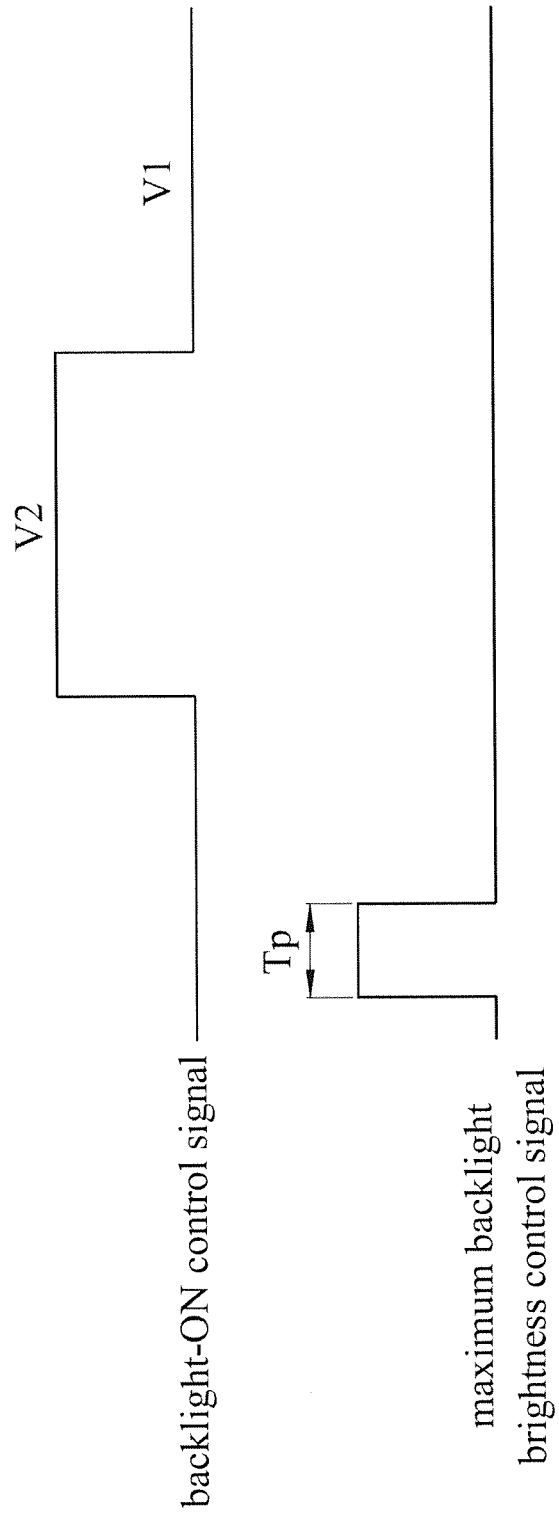
FIG. 12 is a timing diagram illustrating a backlight-ON control signal and a maximum backlight brightness control signal of the sixth preferred embodiment of an LCD system according to this invention.
Figure 13:
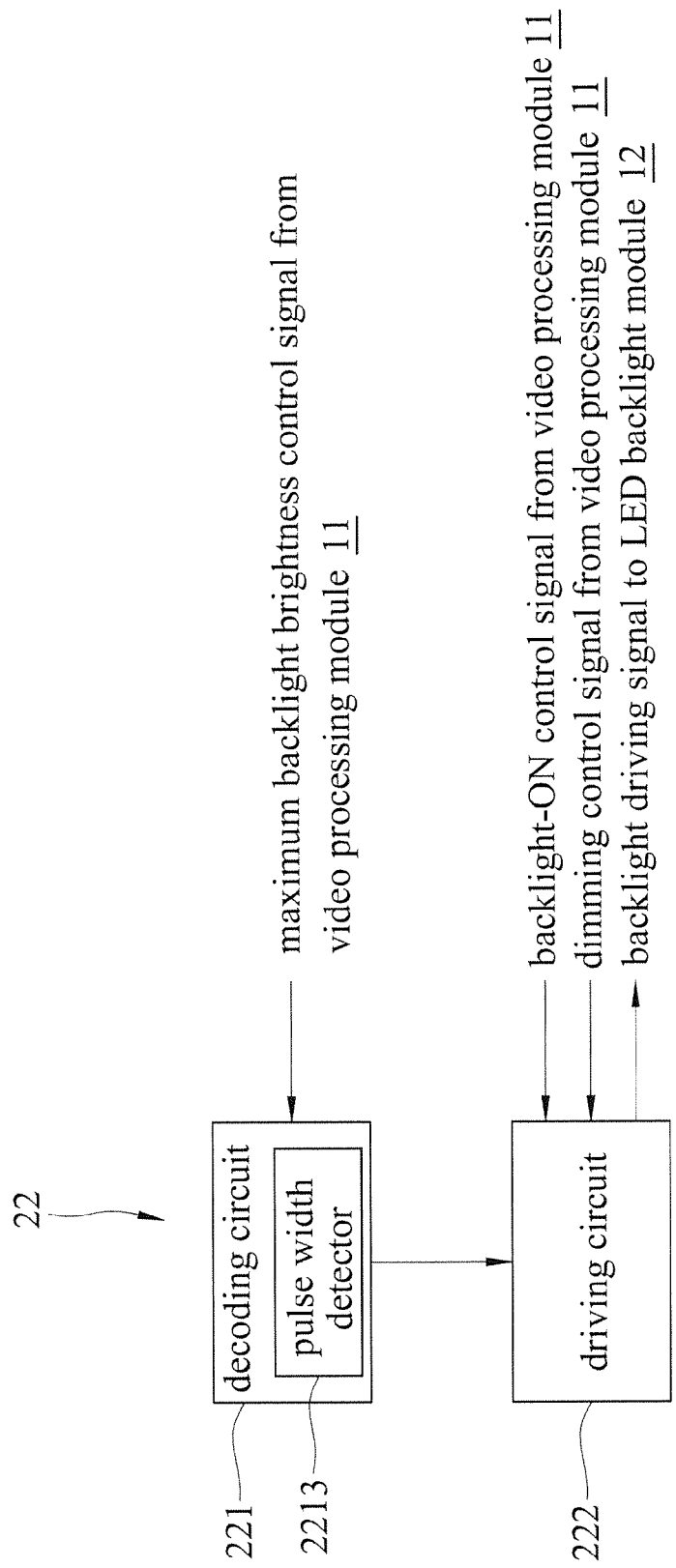
FIG. 13 is a functional block diagram illustrating a backlight driving module of the sixth preferred embodiment.

FIGS. 1, 12 and 13 illustrate the sixth preferred embodiment of an LCD system according to this invention, which is a modification of the fourth preferred embodiment Unlike the fourth preferred embodiment, the maximum backlight brightness control signal of the sixth preferred embodiment includes a pulse with a predetermined width (Tp) that is associated with the type of the LCD device 1. In addition, the decoding circuit 221 of the backlight driving module 22 of the AC adapter 2 includes a pulse width detector 2213, instead of the comparing unit 2211 (see FIG. 9). The pulse width detector 2213 detects the width (Tp) of the pulse of the maximum backlight brightness control signal, and generates the maximum backlight current control signal with reference to a result of the detection so as to associate the maximum backlight current control signal with the type of the LCD device 1. For example, the width (Tp) of the pulse of the maximum backlight brightness control signal may be equal to 1 ms, 2 ms or 3 ms, and the maximum magnitude (Imax) of the backlight current output may be expressed as equation 3.

It is noted that, in other embodiments, the maximum backlight brightness control signal may be any combination of the maximum backlight brightness control signals shown respectively in FIGS. 8, 10 and 12, and the decoding circuit 221 of the backlight driving module 22 of the AC adapter may include a corresponding combination of the comparing unit 2211 (see FIG. 9), the pulse number detector 2212 (see FIG. 11) and the pulse width detector 2213.

Figure 14:
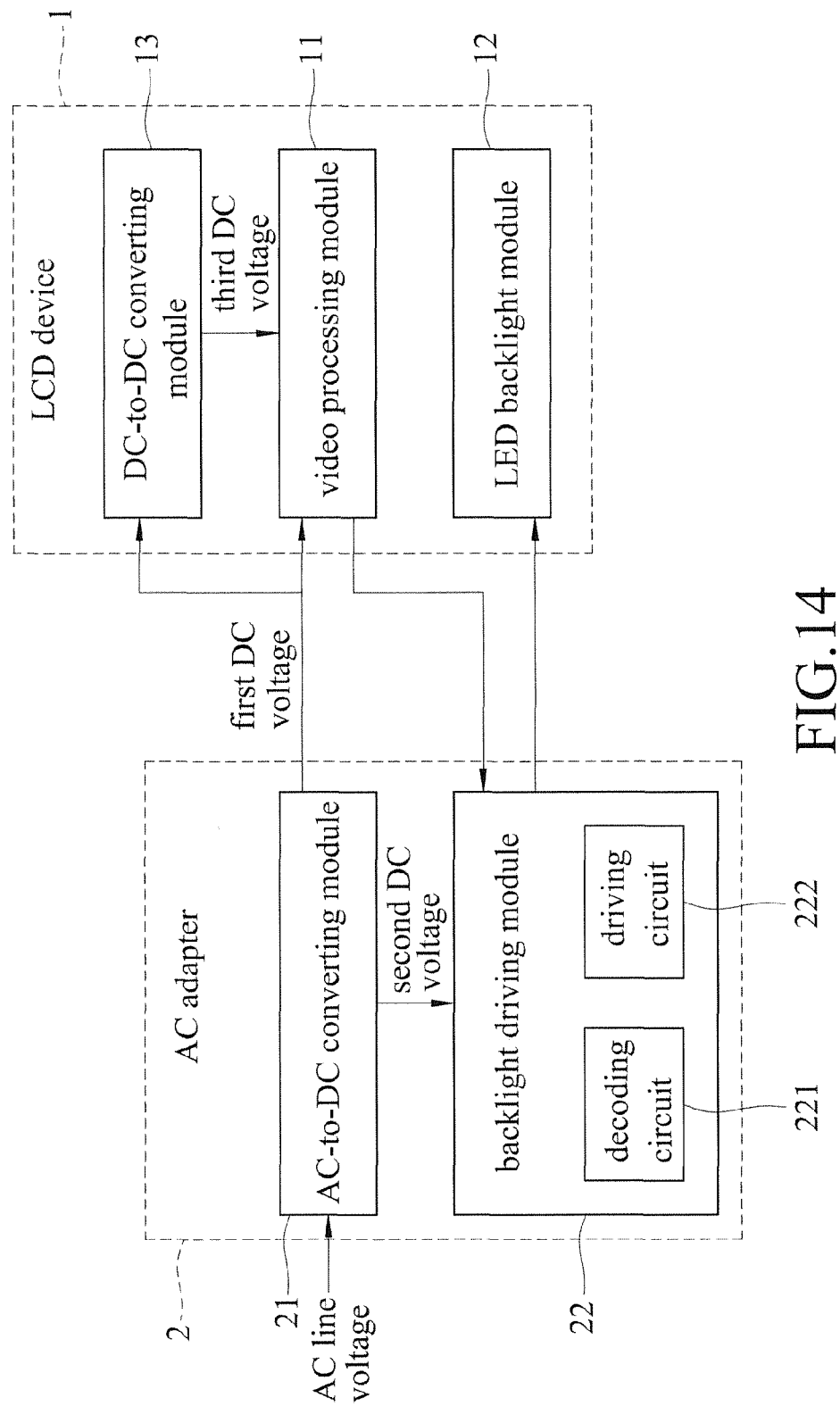
FIG. 14 is a functional block diagram illustrating the seventh preferred embodiment of an LCD system according to this invention.

FIG. 14 illustrates the seventh preferred embodiment of an LCD system according to this invention, which is a modification of the first preferred embodiment. Unlike the first preferred embodiment, the LCD device 1 of the seventh preferred embodiment further includes a DC-to-DC converting module 13 coupled to the AC-to-DC converting module 21 of the AC adapter 2 and the video processing module 11 of the LCD device 1. The AC-to-DC converting module 21 of the AC adapter 2 converts the AC line voltage into a first DC voltage (e.g., 12V) and a second DC voltage (e.g., 32V), and outputs the first and second DC voltages to power the video processing module 11 of the LCD device 1 and the backlight driving module 22 of the AC adapter 2, respectively. The DC-to-DC converting module 13 of the LCD device 1 converts the first DC voltage from the AC-to-DC converting module 21 of the AC adapter 2 into a third. DC voltage (e.g., 5V), and outputs the third DC voltage to power the video processing module 11 of the LCD device 1. In addition, the video processing module 11 of the LCD device 1 does not generate and output the power saving control signal to the AC-to-DC converting module 21 of the AC adapter 2.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A liquid crystal display (LCD) system comprising:
an LCD device including a video processing module and a light emitting diode (LED) backlight module; and
an alternating current (AC) adapter including
a backlight driving module coupled to said LED backlight module of said LCD device, generating a backlight driving signal, and outputting the backlight driving signal to drive said LED backlight module of said LCD device, and
an AC-to-DC (direct current) converting module coupled to said video processing module of said LCD device and said backlight driving module, adapted to convert an AC line voltage into first and second DC voltages, and outputting the first and second DC voltages to power said video processing module of said LCD device and said backlight driving module, respectively,
the video processing module of the LCD device generating a backlight-ON control signal, wherein said backlight driving module includes:
a decoding circuit generating a variable maximum backlight current control signal; and
a driving circuit coupled to said decoding circuit for receiving the maximum backlight current control signal therefrom, and adapted to receive the backlight-ON control signal from the video processing module of the LCD device, said driving circuit generating the backlight driving signal based on the maximum backlight current control signal and the backlight-ON control signal, such that the backlight-ON control signal determines whether or not a backlight current output is provided to the LED backlight module of the LCD device, and such that a maximum magnitude of the backlight current output is associated with the maximum backlight current control signal.

2. The LCD system of claim 1, wherein:
said decoding circuit is coupled to said video processing module of said LCD device for receiving the backlight-ON control signal therefrom, based on the backlight-ON control signal, the maximum backlight current control signal varies depending on the backlight-ON control signal, and
said driving circuit coupled to said video processing module and said LED backlight module of said LCD device.

3. The LCD system of claim 1, wherein:
the backlight-ON control signal switches between first and second voltages; and
said decoding circuit of said backlight driving module of said AC adapter includes a comparing unit for comparing the second voltage with at least one reference voltage, and generating the maximum backlight current control signal with reference to a result of the comparison.

4. The LCD system of claim 1, wherein:
the backlight-ON control signal includes a predetermined number of pulses during a setting time period; and
said decoding circuit of said backlight driving module of said AC adapter includes a pulse number detector for detecting the number of the pulses of the backlight-ON control signal during the setting time period, and generating the maximum backlight current control signal with reference to a result of the detection.

5. The LCD system of claim 1, wherein:
the backlight-ON control signal includes a pulse with a predetermined width during a setting time period; and
said decoding circuit of said backlight driving module of said AC adapter includes a pulse width detector for detecting the width of the pulse of the backlight-ON control signal during the setting time period, and generating the maximum backlight current control signal with reference to a result of the detection.

6. The LCD system of claim 1, wherein:
the maximum backlight brightness control signal has a predetermined voltage; and
said decoding circuit of said backlight driving module of said AC adapter includes a comparing unit for comparing the predetermined voltage of the maximum backlight brightness control signal with at least one reference voltage, and generating the maximum backlight current control signal with reference to a result of the comparison.

7. The LCD system of claim 1, wherein:
the maximum backlight brightness control signal includes a predetermined number of pulses; and
said decoding circuit of said backlight driving module of said AC adapter includes a pulse number detector for detecting the number of the pulses of the maximum backlight brightness control signal, and generating the maximum backlight current control signal with reference to a result of the detection.

8. The LCD system of claim 1, wherein:
the maximum backlight brightness control signal includes a pulse with a predetermined width; and
said decoding circuit of said backlight driving module of said AC adapter includes a pulse width detector for detecting the width of the pulse of the maximum backlight brightness control signal, and generating the maximum backlight current control signal with reference to a result of the detection.

9. The LCD system of claim 1, wherein said LCD device further includes a DC-to-DC converting module coupled to said AC-to-DC converting module of said AC adapter and said video processing module, converting the first DC voltage from said AC-to-DC converting module of said AC adapter into a third DC voltage, and outputting the third DC voltage to power said video processing module.

10. An alternating current (AC) adapter for powering and driving a liquid crystal display (LCD) device that includes a video processing module and a light emitting diode (LED) backlight module, said AC adapter comprising:
- a backlight driving module generating a backlight driving signal that is adapted to drive the LED backlight module of the LCD device; and
- an AC-to-DC (direct current) converting module coupled to said backlight driving module, and adapted to receive an AC line voltage, said AC-to-DC converting module converting the AC line voltage into a first DC voltage that is adapted to power the video processing module of the LCD device, and into a second DC voltage to power said backlight driving module,
- the video processing module of the LCD device generating a backlight-ON control signal, wherein said backlight driving module includes:
- a decoding circuit generating a variable maximum backlight current control signal; and
- a driving circuit coupled to said decoding circuit for receiving the maximum backlight current control signal therefrom, and adapted to receive the backlight-ON control signal from the video processing module of the LCD device, said driving circuit generating the backlight driving signal based on the maximum backlight current control signal and the backlight-ON control signal, such that the backlight-ON control signal determines whether or not a backlight current output is provided to the LED backlight module of the LCD device, and such that a maximum magnitude of the backlight current output is associated with the maximum backlight current control signal.

11. The AC adapter of claim 10, the backlight-ON control signal switching between first and second voltages, wherein said decoding circuit of said backlight driving module is adapted to receive the backlight-ON control signal from the video processing module of the LCD device, and includes a comparing unit for comparing the second voltage with at least one reference voltage and generating the maximum backlight current control signal with reference to a result of the comparison.

12. The AC adapter of claim 10, the backlight-ON control signal including a predetermined number of pulses during a setting time period, wherein said decoding circuit of said backlight driving module is adapted to receive the backlight-ON control signal from the video processing module of the LCD device, and includes a pulse number detector for detecting the number of the pulses of the backlight-ON control signal during the setting time period and generating the maximum backlight current control signal with reference to a result of the detection.

13. The AC adapter of claim 10, the backlight-ON control signal including a pulse with a predetermined width during a setting time period, wherein said decoding circuit of said backlight driving module is adapted to receive the backlight-ON control signal from the video processing module of the LCD device, and includes a pulse width detector for detecting the width of the pulse of the backlight-ON control signal during the setting time period and generating the maximum backlight current control signal with reference to a result of the detection.

14. The AC adapter of claim 10, the video processing module of the LCD device further generating a maximum backlight brightness control signal that has a predetermined voltage, wherein said decoding circuit of said backlight driving module is adapted to receive the maximum backlight brightness control signal from the video processing module of the LCD device, and includes a comparing unit for comparing the predetermined voltage of the maximum backlight brightness control signal with at least one reference voltage and generating the maximum backlight current control signal with reference to a result of the comparison.

15. The AC adapter of claim 10, the video processing module of the LCD device further generating a maximum backlight brightness control signal that includes a predetermined number of pulses, wherein said decoding circuit of said backlight driving module is adapted to receive the maximum backlight brightness control signal from the video processing module of the LCD device, and includes a pulse number detector for detecting the number of the pulses of the maximum backlight brightness control signal and generating the maximum backlight current control signal with reference to a result of the detection.

16. The AC adapter of claim 10, the video processing module of the LCD device further generating a maximum backlight brightness control signal that includes a pulse with a predetermined width, wherein said decoding circuit of said backlight driving module is adapted to receive the maximum backlight brightness control signal from the video processing module of the LCD device, and includes a pulse width detector for detecting the width of the pulse of the maximum backlight brightness control signal and generating the maximum backlight current control signal with reference to a result of the detection.

17. A backlight driving module for generating a backlight driving signal that is adapted to drive a light emitting diode (LED) backlight module of a liquid crystal display (LCD) device, the LCD device further including a video processing module that generates a backlight-ON control signal, said backlight driving module comprising:
- a decoding circuit generating a variable maximum backlight current control signal; and
- a driving circuit coupled to said decoding circuit for receiving the maximum backlight current control signal therefrom, and adapted to receive the backlight-ON control signal from the video processing module of the LCD device, said driving circuit generating the backlight driving signal based on the maximum backlight current control signal and the backlight-ON control signal, such that the backlight-ON control signal determines whether or not a backlight current output is provided to the LED backlight module of the LCD device, and such that a maximum magnitude of the backlight current output is associated with the maximum backlight current control signal.

18. The backlight driving module of claim 17, wherein said decoding circuit includes at least one of a comparing unit, a pulse number detector and a pulse width detector.

* * * * *